(12) United States Patent
Su et al.

(10) Patent No.: US 10,371,971 B2
(45) Date of Patent: Aug. 6, 2019

(54) LIQUID CRYSTAL DISPLAY WITH SWITCHABLE VIEWING ANGLE AND METHOD OF VIEWING ANGLE CONTROL

(71) Applicant: Infovision Optoelectronics (Kunshan) Co., Ltd., Kunshan, Jiangsu Province (CN)

(72) Inventors: Zifang Su, Kunshan (CN); Yaqin Xu, Kunshan (CN)

(73) Assignee: INFOVISION OPTOELECTRONICS (KUSHAN) CO., LTD., Kunshan, Jiangsu Province (CN)

( * ) Notice: Subject to any disclaimer, the term of this patent is extended or adjusted under 35 U.S.C. 154(b) by 240 days.

(21) Appl. No.: 15/207,944

(22) Filed: Jul. 12, 2016

(65) Prior Publication Data

US 2017/0123241 A1    May 4, 2017

(30) Foreign Application Priority Data

Nov. 3, 2015   (CN) .......................... 2015 1 0736377

(51) Int. Cl.
G02F 1/13      (2006.01)
G02F 1/1343    (2006.01)
G02F 1/1337    (2006.01)

(52) U.S. Cl.
CPC ...... *G02F 1/1323* (2013.01); *G02F 1/133784* (2013.01); *G02F 1/134363* (2013.01); *G02F 2001/134372* (2013.01); *G02F 2001/134381* (2013.01)

(58) Field of Classification Search
None
See application file for complete search history.

(56) References Cited

U.S. PATENT DOCUMENTS

| 2007/0200986 A1* | 8/2007 | Ong ..................... G02F 1/13363 |
|---|---|---|
| | | 349/117 |
| 2012/0135661 A1* | 5/2012 | Imanishi ................ C08L 79/08 |
| | | 445/24 |
| 2014/0002761 A1 | 1/2014 | Heo et al. |
| 2014/0104522 A1* | 4/2014 | Onda ................ G02F 1/134363 |
| | | 349/33 |

(Continued)

FOREIGN PATENT DOCUMENTS

| CN | 101526702 A | 9/2009 |
|---|---|---|
| CN | 101738792 A | 6/2010 |

(Continued)

*Primary Examiner* — Edward J Glick
*Assistant Examiner* — Anthony G Quash
(74) *Attorney, Agent, or Firm* — Cheng-Ju Chiang

(57) ABSTRACT

An LCD with switchable viewing angle includes a first substrate, second substrate, and a liquid crystal layer. The first substrate is provided with a first electrode and a first alignment film thereon. The second substrate is provided with a second electrode, a third electrode and a second alignment film thereon. The liquid crystal layer is disposed between the first alignment film and the second alignment film, and includes a plurality of liquid crystal molecules. All of the liquid crystal molecules in the liquid crystal layer are tilted at the same pretilt angle relative to the alignment films. When no bias voltage is applied to the first electrode, the LCD shows a narrow viewing angle; and when a bias voltage is applied to the first electrode, the LCD shows a wide viewing angle.

12 Claims, 21 Drawing Sheets

(56) References Cited

U.S. PATENT DOCUMENTS

2014/0191933 A1* 7/2014 Fan ................... G02F 1/133
 345/89
2014/0340621 A1* 11/2014 Chung .............. G02F 1/133514
 349/106

FOREIGN PATENT DOCUMENTS

| CN | 103728792 A | | 4/2014 | |
|---|---|---|---|---|
| CN | 104155808 A | * | 11/2014 | ........... G02F 1/1323 |
| CN | 104865757 A | | 8/2015 | |
| CN | 105068337 A | | 11/2015 | |
| CN | 105223743 A | | 1/2016 | |
| JP | 2009-20293 A | | 1/2009 | |
| JP | 2009020293 A | * | 1/2009 | ........... G02F 1/1347 |
| TW | 201329526 A1 | | 7/2013 | |

* cited by examiner

LIQUID CRYSTAL DISPLAY WITH SWITCHABLE VIEWING ANGLE AND METHOD OF VIEWING ANGLE CONTROL

CROSS-REFERENCE TO RELATED APPLICATION

The present application is based on and claims priority of Chinese patent application No. 201510736377.8, filed on Nov. 3, 2015. The entire disclosure of the above-identified application is hereby incorporated by reference herein and made a part of this specification.

TECHNICAL FIELD

The present application relates to liquid crystal display technology, and more particularly to a liquid crystal display with switchable viewing angle, and a method of controlling the viewing angle of a liquid crystal display.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices.

Wide viewing angle is the mainstream development of the LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in the LCD. One way is to use a louver shielding film to cover the screen so as to narrow the viewing angle in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the viewing angle. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD with switchable viewing angle. The LCD can realize switching between a narrow viewing angle and a wide viewing angle, without the need to use a louver shielding film or to provide a dual light source backlight system in the LCD, and without increasing the thickness and the cost of the LCD.

In particular, the present application provides an LCD with switchable viewing angle. The LCD includes a first substrate, a second substrate, and a liquid crystal layer disposed between the first substrate and the second substrate. The first substrate is provided with a first electrode, a first alignment film and a first polarizer thereon. The second substrate is provided with a second electrode, a third electrode, a second alignment film and a second polarizer thereon, wherein one of the second electrode and the third electrode is a common electrode, and the other one is a pixel electrode. Liquid crystal molecules of the liquid crystal layer are negative liquid crystal molecules. All of the liquid crystal molecules in the liquid crystal layer are tilted at the same pretilt angle relative to the alignment films.

By applying a bias voltage to the first electrode or not, the viewing angle of the LCD is controlled. When no bias voltage is applied to the first electrode, lights passing the liquid crystal molecules are not matched with the light transmission axis of the first polarizer and the second polarizer, a light leakage in the dark state is resulted and the contrast between the bright state and the dark state of the LCD is accordingly decreased, to thereby achieve a narrow viewing angle display mode. When a bias voltage is applied to the first electrode, a vertical electric field is generated between the first substrate and the second substrate to cause the liquid crystal molecules in the liquid crystal layer to rotate. As the liquid crystal molecules rotate, the tilt angle of the liquid crystal molecules is reduced from the pretilt angle. Particularly, when a relatively large bias voltage is applied to the first electrode, the tilt angle of the liquid crystal molecules may reduce from the pretilt angle to nearly zero degree in which the liquid crystal molecules are substantially parallel to the first and second substrates. As a result, the light leakage phenomenon in the dark state will not occur and the contrast between the bright state and the dark state is increased, a wide viewing angle display mode is thereby achieved.

In another aspect, a method of controlling the viewing angle of the LCD is provided. The method includes the steps: when the LCD is required to display with a narrow viewing angle, applying no bias voltage to the first electrode; and when the LCD is required to display with a wide viewing angle, applying a bias voltage to the first electrode.

Therefore, the viewing angle of the LCD can be easily switched between a narrow viewing angle and a wide viewing angle by simply applying a bias voltage to the first electrode of the first substrate. It is not required to use a louver shielding film or to provide a dual light source backlight system in the LCD, without increasing the thickness and the cost of the LCD and having the advantages of easy operation and good flexibility.

Other novel features and advantages will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
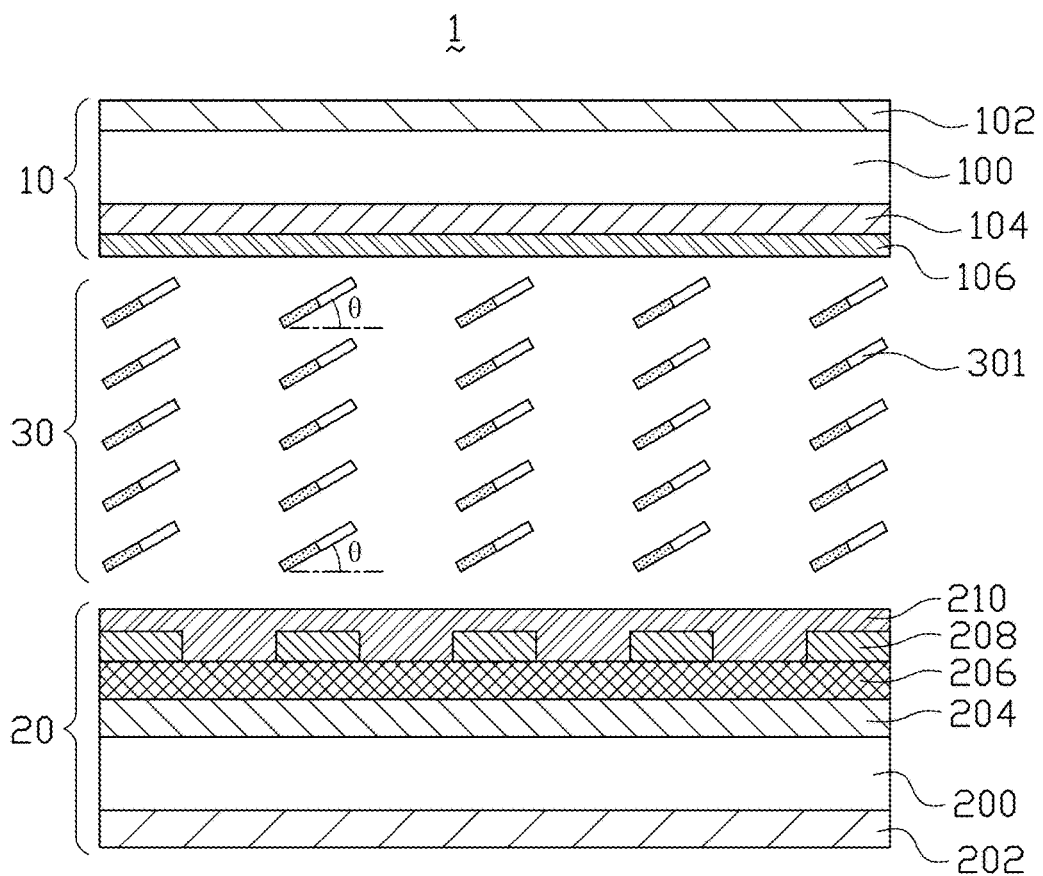
FIG. 1 schematically shows a cross-sectional view of an LCD according to an embodiment of the present application.
Figure 2:
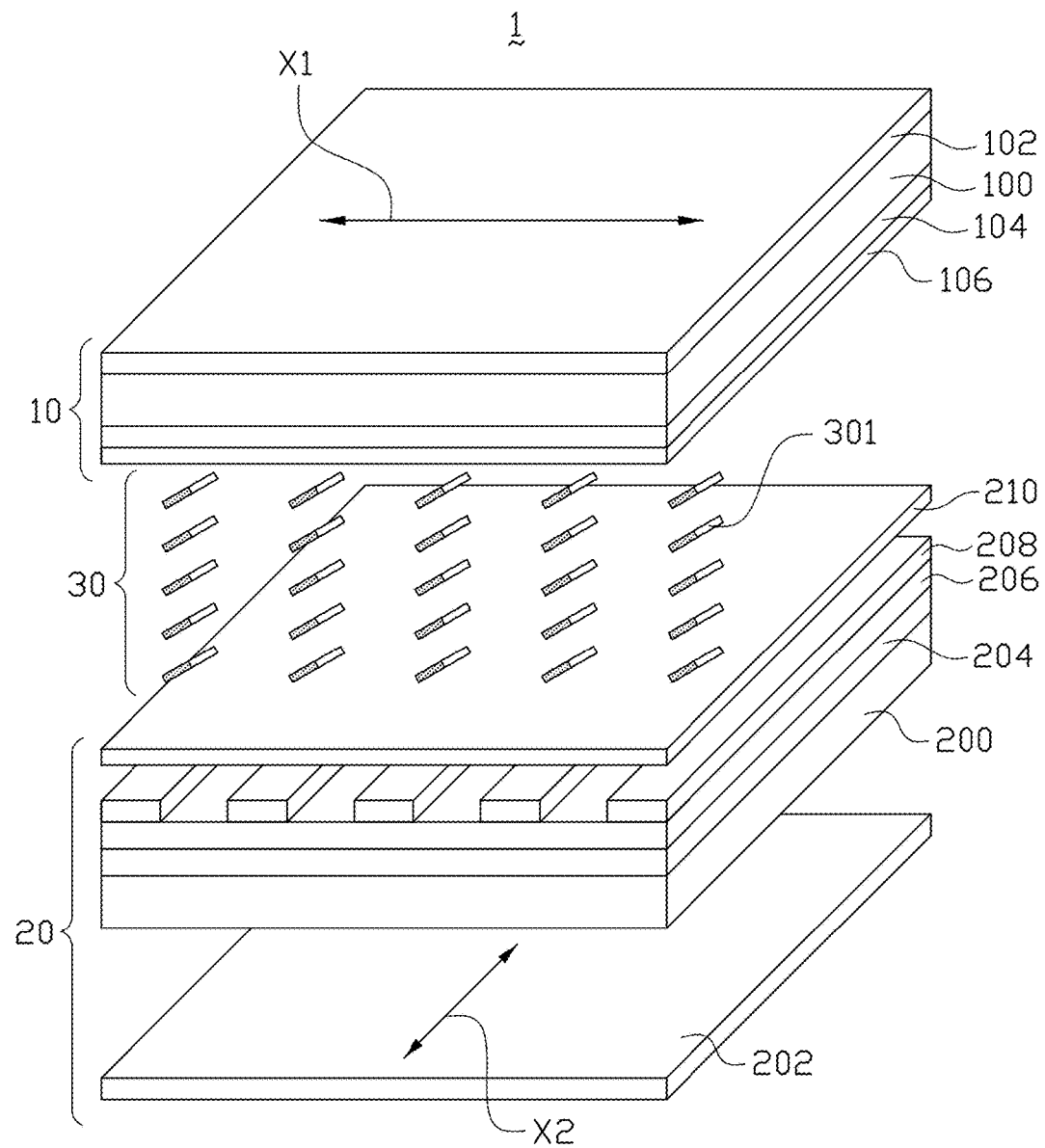
FIG. 2 schematically shows a perspective view of the LCD of FIG. 1.

FIG. 1 schematically shows a cross-sectional view of an LCD according to an embodiment of the present application. FIG. 2 schematically shows a perspective view of the LCD of FIG. 1. In order for clarity, in FIGS. 1-2, only a portion of the LCD is shown. Referring to FIGS. 1-2, the present application provides a liquid crystal display (LCD) 1 with switchable viewing angle. In the embodiment, the LCD 1 includes a first substrate 10, a second substrate 20, and a liquid crystal layer 30 disposed and sealed between the first substrate 10 and the second substrate 20.

Generally, when a user views an LCD from different viewing angles, the brightness of image may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are both formed on the same substrate (e.g., the array substrate), the liquid crystal molecules rotate in a plane in parallel to the substrate to obtain improved viewing angle.

The LCD 1 is suitable for application in FFS type LCD or IPS type LCD in which the liquid crystal molecules rotate in a plane parallel to the substrate when an electric field between the pixel electrode and the common electrode is provided. In this embodiment, the LCD 1 is shown as an FFS type LCD by an example.

Specifically, the first substrate 10 may be a color filter substrate. The first substrate 10 may include a first transparent base 100, a first polarizer 102, a first electrode 104, and a first alignment film 106. The first polarizer 102 is arranged on an outer surface of the first transparent base 100 far away from the liquid crystal layer 30. The first polarizer 102 has a first light transmission axis X1 (see FIG. 2). The first electrode 104 is arranged on an inner surface of the first transparent base 100 facing the liquid crystal layer 30. The first alignment film 106 is arranged on an inner surface of the first electrode 104 facing the liquid crystal layer 30. The first electrode 104 is transparent, and may be made of Indium Tin Oxide (ITO), Indium Zinc Oxide (IZO) and so on. The first electrode 104 may wholly cover the first transparent base 100, that is, the first electrode 104 is a surface electrode without being patterned.

The second substrate 20 may be a thin film transistor (TFT) array substrate. The second substrate 20 may include a second transparent base 200, a second polarizer 202, a second electrode 204, an insulating layer 206, a third electrode 208, and a second alignment film 210. The second polarizer 202 is arranged on an outer surface of the second transparent base 200 far away from the liquid crystal layer 30. The second polarizer 202 has a second light transmission axis X2 (see FIG. 2). The first light transmission axis X1 of the first polarizer 102 and the second light transmission axis X2 of the second polarizer 202 are perpendicular to each other. The second electrode 204 is arranged on an inner surface of the second transparent base 200 facing the liquid crystal layer 30. The insulating layer 206 is arranged on an inner surface of the second electrode 204 facing the liquid crystal layer 30. The third electrode 208 is arranged on an inner surface of the insulating layer 206 facing the liquid crystal layer 30. The second alignment film 210 is arranged on an inner surface of the third electrode 208 facing the liquid crystal layer 30.

The second electrode 204 and the third electrode 208 are transparent, and may be made of Indium Tin Oxide (ITO), Indium Zinc Oxide (IZO) and so on. In the embodiment, the second electrode 204 may wholly cover the second transparent base 200, that is, the second electrode 204 is a surface electrode without being patterned. The third electrode 208 is patterned to form a plurality of electrode stripes (not labeled) which are arranged in parallel to each other. In other embodiments, similar to the third electrode 208, the second electrode 204 may also be patterned to form a plurality of electrode stripes which are arranged in parallel to each other.

In one embodiment, the second electrode 204 may be a pixel electrode, which is formed in each pixel of the LCD 1, the third electrode 208 may be a common electrode for inputting a common voltage (i.e., Vcom) from a driver IC (not shown).

In another embodiment, the second electrode 204 may be a common electrode for inputting a common voltage (i.e., Vcom) from a driver IC (not shown), the third electrode 208 may a pixel electrode, which is formed in each pixel of the LCD 1.

The liquid crystal layer 30 is provided with a plurality of liquid crystal molecules 301 which are sealed between the first alignment film 106 and the second alignment film 210. The first alignment film 106 and the second alignment film 210 can be made of polyimide (PI). The first alignment film 106 and the second alignment film 210 are used to align the liquid crystal molecules 301, so that the liquid crystal molecules 301 are oriented in predetermined directions. For example, each of the alignment films 106, 210 may be subjected to a rubbing treatment according to publicly known rubbing process. After the rubbing process, the first alignment film 106 has a first rubbing direction (not shown), the second alignment film 210 has a second rubbing direction (not shown). In this embodiment, the first rubbing direction of the first alignment film 106 is the same as the second rubbing direction of the second alignment film 210. That is, the first rubbing direction of the first alignment film 106 and the second rubbing direction of the second alignment film 210 are extended in the same direction. The liquid crystal molecules 301 in the liquid crystal layer 30 are arranged and oriented along the first rubbing direction of the first alignment film 106 and along the second rubbing direction of the second alignment film 210.

Further, as shown in FIG. 1, all of the liquid crystal molecules 301 in the liquid crystal layer 30 are tilted at the same pretilt angle θ relative to the alignment films 106, 210. That is, an acute angle θ is formed between the surface of the first alignment film 106 (or the second alignment film 210) and the long axis of the liquid crystal molecules 301, so that all of the liquid crystal molecules 301 are arranged along the rubbing directions of the first alignment film 106 and the second alignment film 210 at a tilted state with the same pretilt angle θ.

As shown in the embodiment of FIG. 1, all of the liquid crystal molecules 301 in the liquid crystal layer 30 are tilted in a direction so as to form the pretilt angle θ. For example, all of the liquid crystal molecules 301 in the liquid crystal layer 30 can be tilted in a counter-clockwise direction to form a tilted state with the same pretilt angle θ. Preferably, the pretilt angle θ is in the range of 30° ~70°, i.e., 30°≤θ≤70°. For example, in different embodiments, the pretilt angle θ can be at 30°, 40°, 50°, 60°, 70°, etc.

Liquid crystal molecules are generally divided into positive liquid crystal molecules and negative liquid crystal molecules. In the embodiment, the liquid crystal molecules 301 of the liquid crystal layer 30 are negative liquid crystal molecules. Since the negative liquid crystal molecules 301 will rotate to a direction perpendicular to the electric field, when the LCD 1 is applied with an electric field for display by a voltage difference exerted between the second electrode 204 and the third electrode 208, the negative liquid crystal molecules 301 of the liquid crystal layer 30 will rotate in a plane in parallel to the first substrate 10 and the second substrate 20, and the short axis of the negative liquid crystal molecules 301 are parallel to the electric field, so that the LCD 1 has better light transmission.

Figure 3:
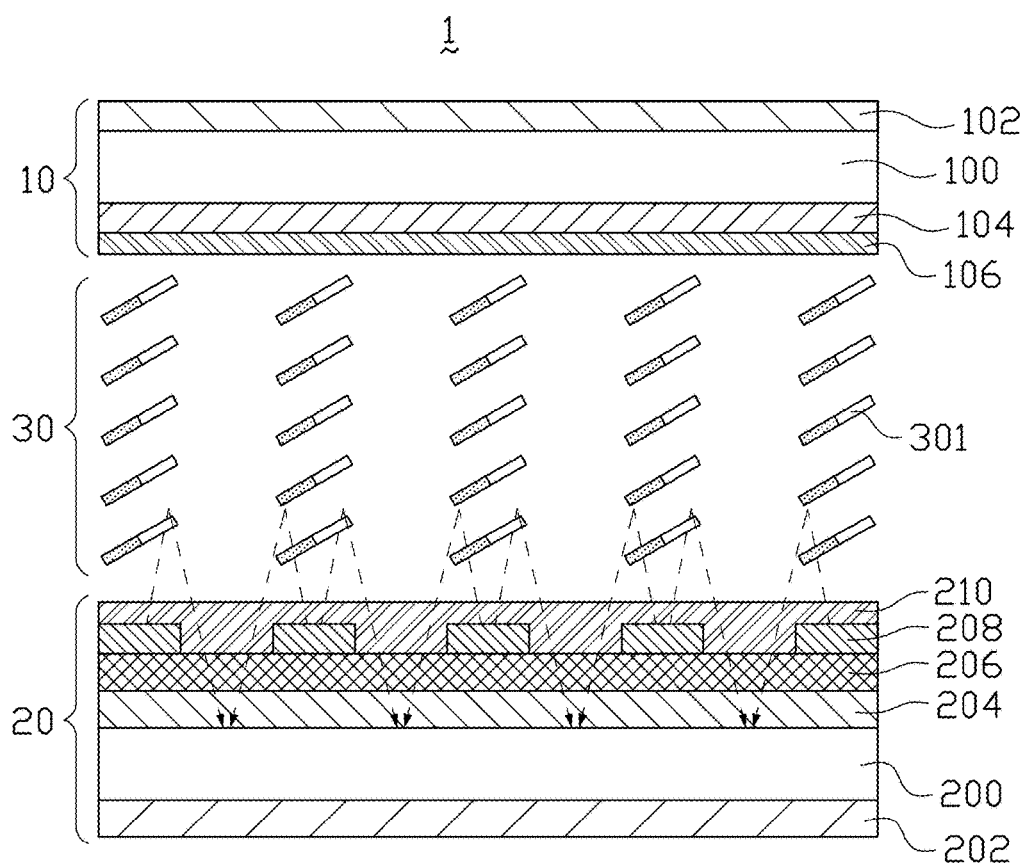
FIG. 3 schematically shows a cross-sectional view of the LCD of FIG. 1 in a narrow viewing angle display mode.
Figure 4:
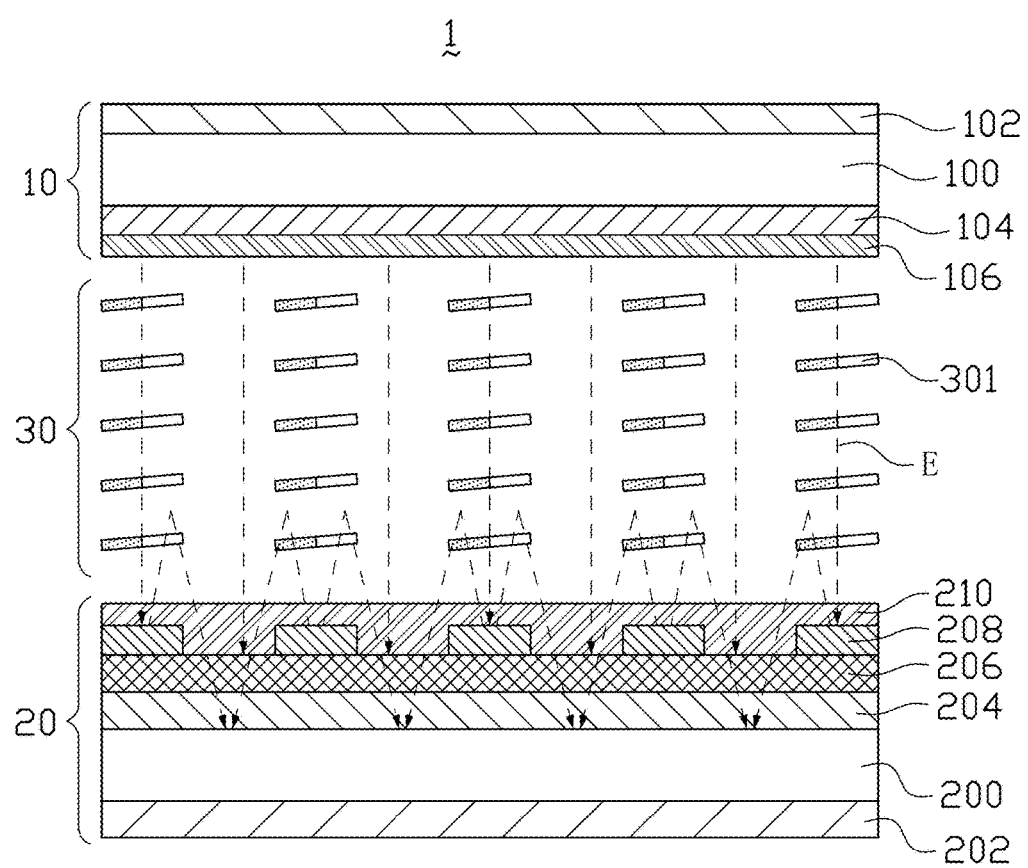
FIG. 4 schematically shows a cross-sectional view of the LCD of FIG. 1 in a wide viewing angle display mode.

Referring to FIGS. 3-4, when using the LCD 1, people can switch freely between a narrow viewing angle and a wide viewing angle. In FIG. 3, the LCD 1 is shown for display with a narrow viewing angle. In FIG. 4, the LCD 1 is shown for display with a wide viewing angle.

As shown in FIG. 3, when no bias voltage is applied to the first electrode 104, the LCD 1 shows a narrow viewing angle. In the present LCD 1, all of the liquid crystal molecules 301 in the liquid crystal layer 30 are tilted and have the same pretilt angle θ relative to the substrates 10, 20. Therefore, when the LCD 1 is used for display, lights passing through the liquid crystal molecules 301 will no longer match with the light transmission axis X1, X2 of the first polarizer 102 and the second polarizer 202 due to phase delay, a light leakage phenomenon is resulted, and the contrast between the bright state and the dark state is accordingly decreased when the LCD 1 is viewed from a squint direction. Thus, the viewing effect of the LCD 1 is affected to achieve a narrow viewing angle display mode.

As shown in FIG. 4, when a bias voltage (e.g., 4V) is provided to the first electrode 104, a vertical electric field E will be generated between the first substrate 10 and the second substrate 20. The negative liquid crystal molecules 301 will rotate under the action of the vertical electric field E. As the liquid crystal molecules 301 rotate under the action of the vertical electric field E, the tilt angle of all the liquid crystal molecules 301 is gradually reduced from the pretilt angle θ. When the tilt angle of all the liquid crystal molecules 301 is reduced to be nearly paralleled with the substrates 10, 20, the light leakage phenomenon will not occur when the LCD 1 is viewed from a horizontal direction. Thus, the viewing angle of the LCD 1 is enlarged to achieve a wide viewing angle display mode as normal FFS LCDs.

It should be noted that, under the action of the vertical electric field E generated between the first substrate 10 and the second substrate 20, all of the liquid crystal molecules 301 may become substantially parallel to the substrates 10, 20 with a tilt angle of about 2°. Further, in the peripheral edge, the first substrate 10 and the second substrate 20 may be electrically connected via an electrically conductive material such as gold balls, such that the bias voltage applied to the first electrode 104 of the first substrate 10 can be inputted from a printed circuit board (PCB) which is connected to the second substrate 20.

In the following, TechWiz software is used to simulate the viewing angle and the display effect of the LCD 1.

Figure 5A:
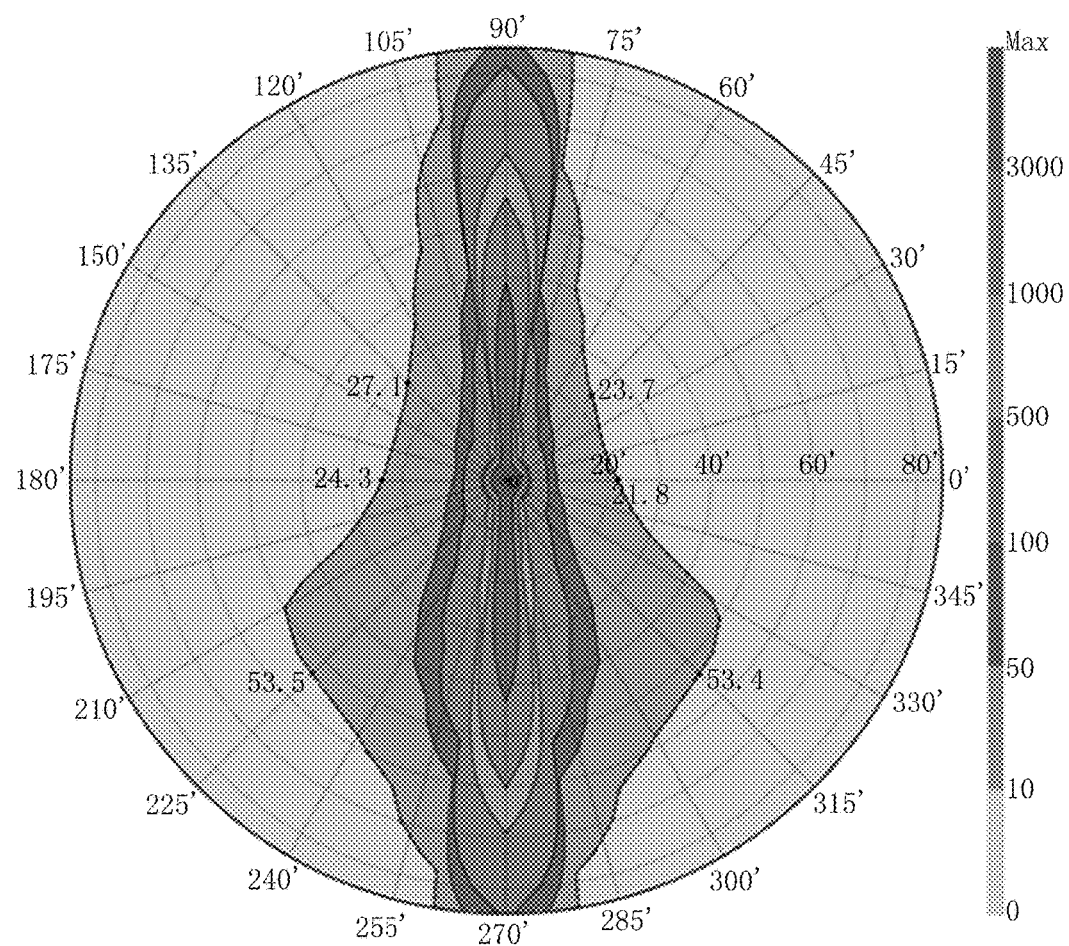
FIGS. 5a-5e show various viewing angle simulation results of the LCD of FIG. 1 when no bias voltage is applied to the first electrode.
Figure 5B:
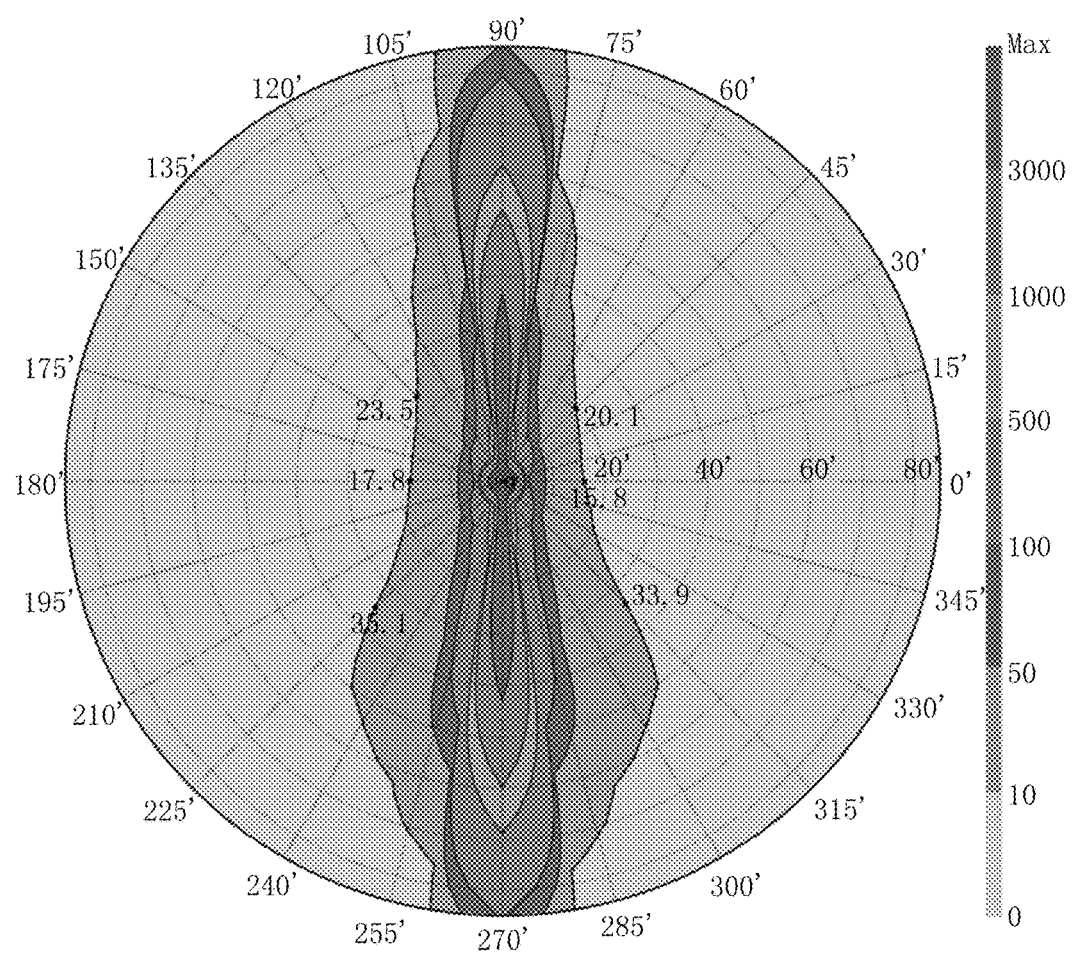
Figure 5C:
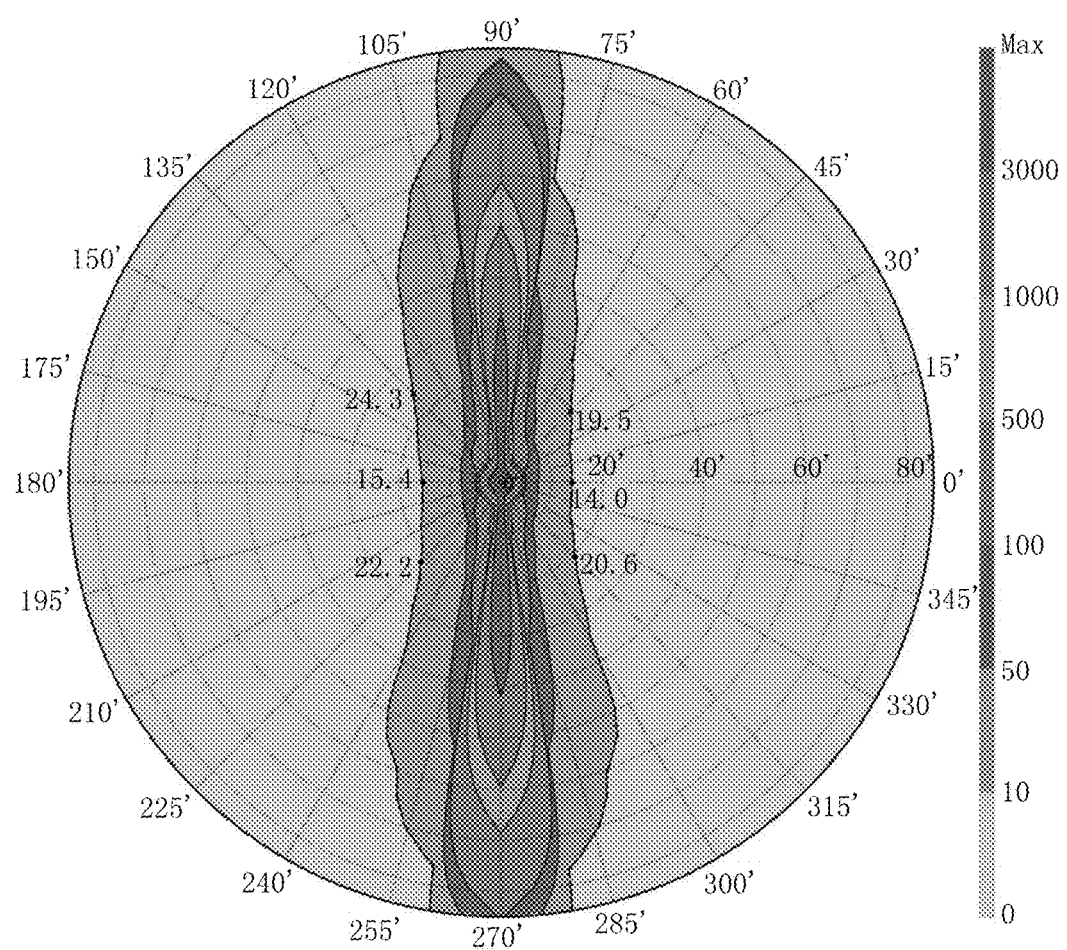
Figure 5D:
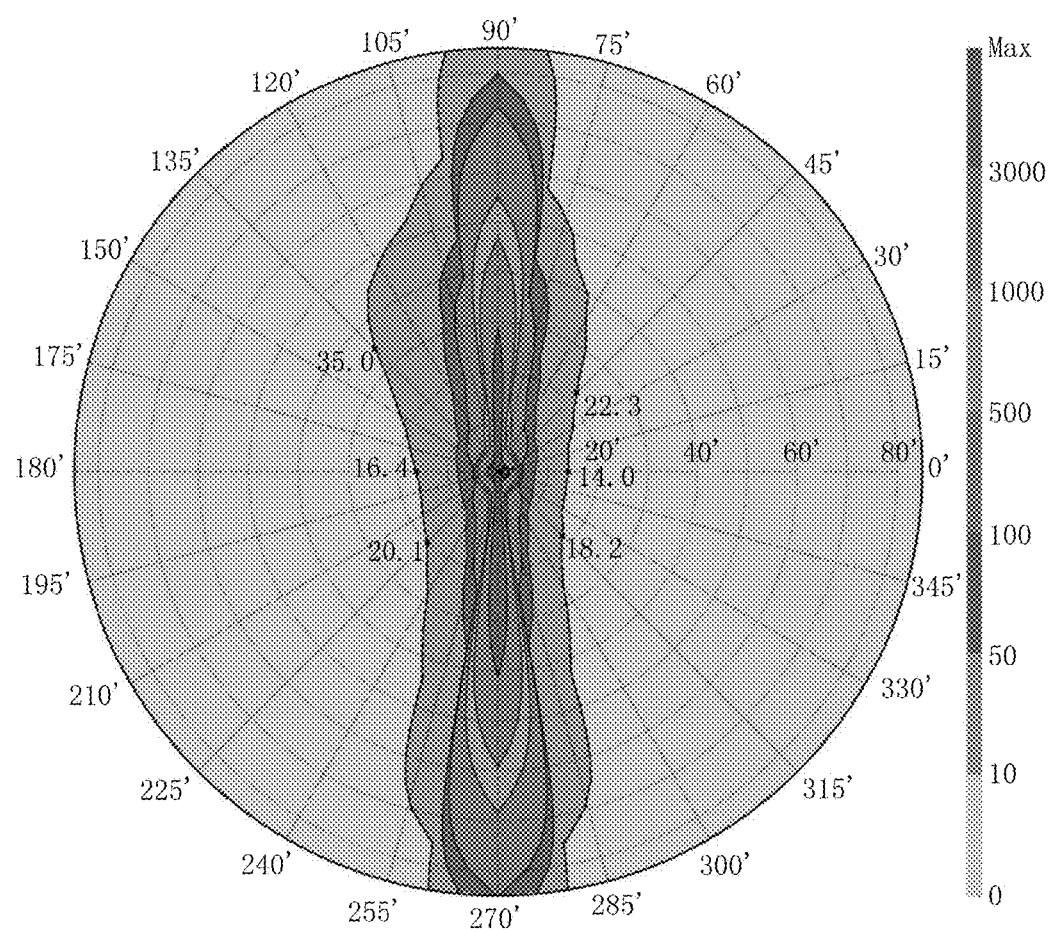
Figure 5E:
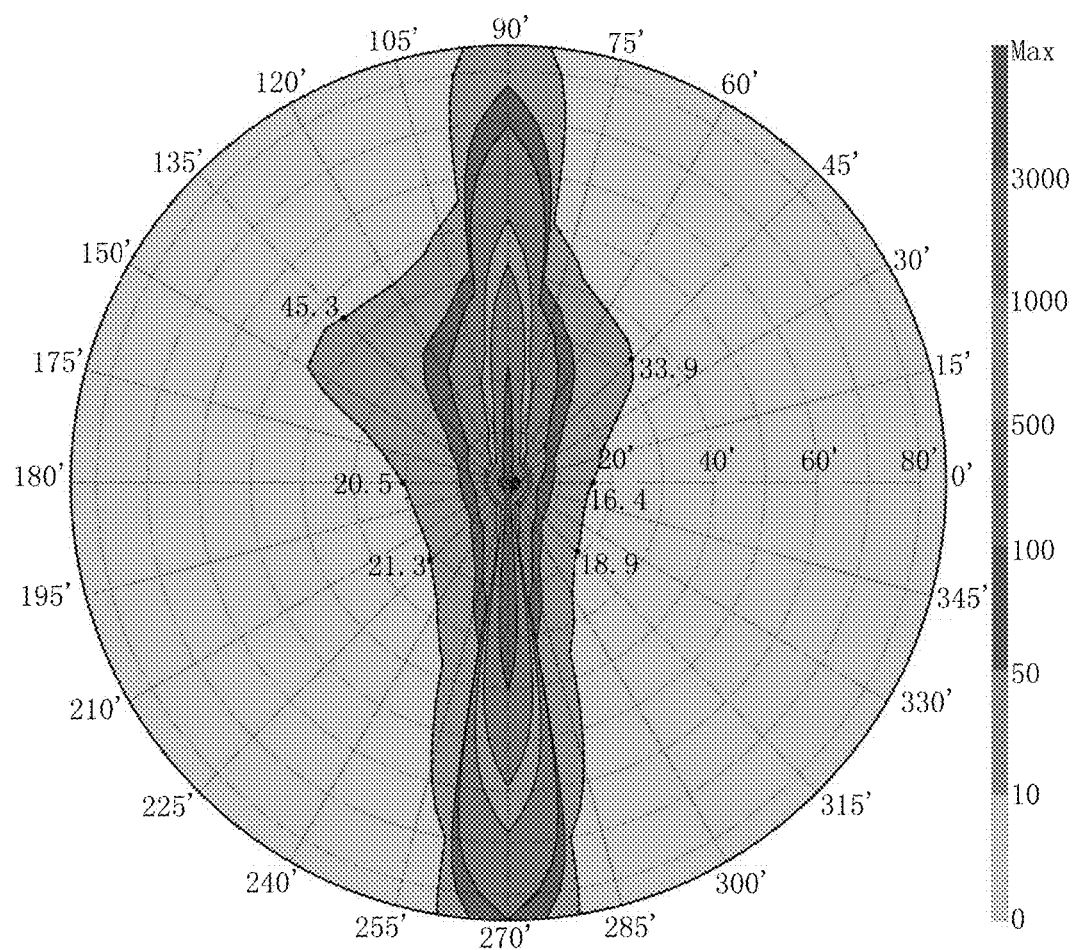

FIGS. 5a-5e show various viewing angle simulation results of the LCD 1 when no bias voltage is applied to the first electrode 104. Among them, FIG. 5a shows the viewing angle simulation result when the pretilt angle θ is at 30°; FIG. 5b shows the viewing angle simulation result when the pretilt angle θ is at 40°; FIG. 5c shows the viewing angle simulation result when the pretilt angle θ is at 50°; FIG. 5d shows the viewing angle simulation result when the pretilt angle θ is at 60°; and FIG. 5e shows the viewing angle simulation result when the pretilt angle θ is at 70°. As can be seen from FIGS. 5a to 5e, with the increase of the pretilt angle θ, the contrast of the LCD 1 decreases, and the LCD 1 always has a viewing angle of about 15 degrees in the horizontal direction. For example, when the pretilt angle θ is at 30°, the contrast is 6747.44, and the LCD 1 can only be effectively viewed from a viewing angle from about −24 degrees to about 21 degrees in the horizontal direction, as shown in FIG. 5a; when the pretilt angle θ is at 40°, the contrast is 6335.05, and the LCD 1 can only be effectively viewed from a viewing angle from about −18 degrees to about 16 degrees in the horizontal direction, as shown in FIG. 5b; when the pretilt angle θ is at 50°, the contrast is 5870.64, and the LCD 1 can only be effectively viewed from a viewing angle from about −15 degrees to about 14 degrees in the horizontal direction, as shown in FIG. 5c; when the pretilt angle θ is at 60°, the contrast is 5373.95, and the LCD 1 can only be effectively viewed from a viewing angle from about −16 degrees to about 14 degrees in the horizontal direction, as shown in FIG. 5d; and when the pretilt angle θ is at 70°, the contrast is 4811.98, and the LCD 1 can only be effectively viewed from a viewing angle from about −20 degrees to about 16 degrees in the horizontal direction, as shown in FIG. 5e. Therefore, from FIGS. 5a to 5e, it can be seen that the LCD 1 can achieve a narrow viewing angle and meets the requirement for protecting the privacy under the narrow viewing angle display mode when no bias voltage is applied to the first electrode 104.

Figure 6A:
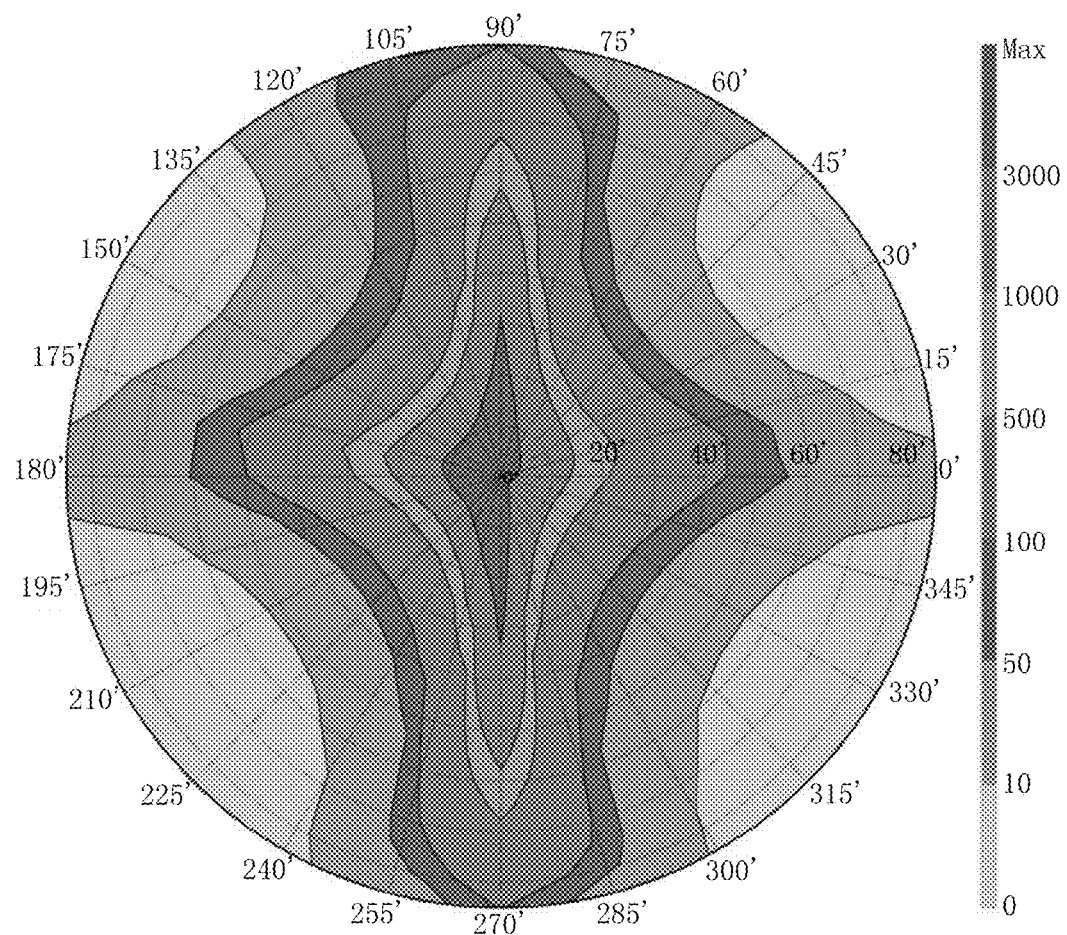
FIGS. 6a-6e show various viewing angle simulation results of the LCD of FIG. 1 when a bias voltage of 8V is applied to the first electrode.
Figure 6B:
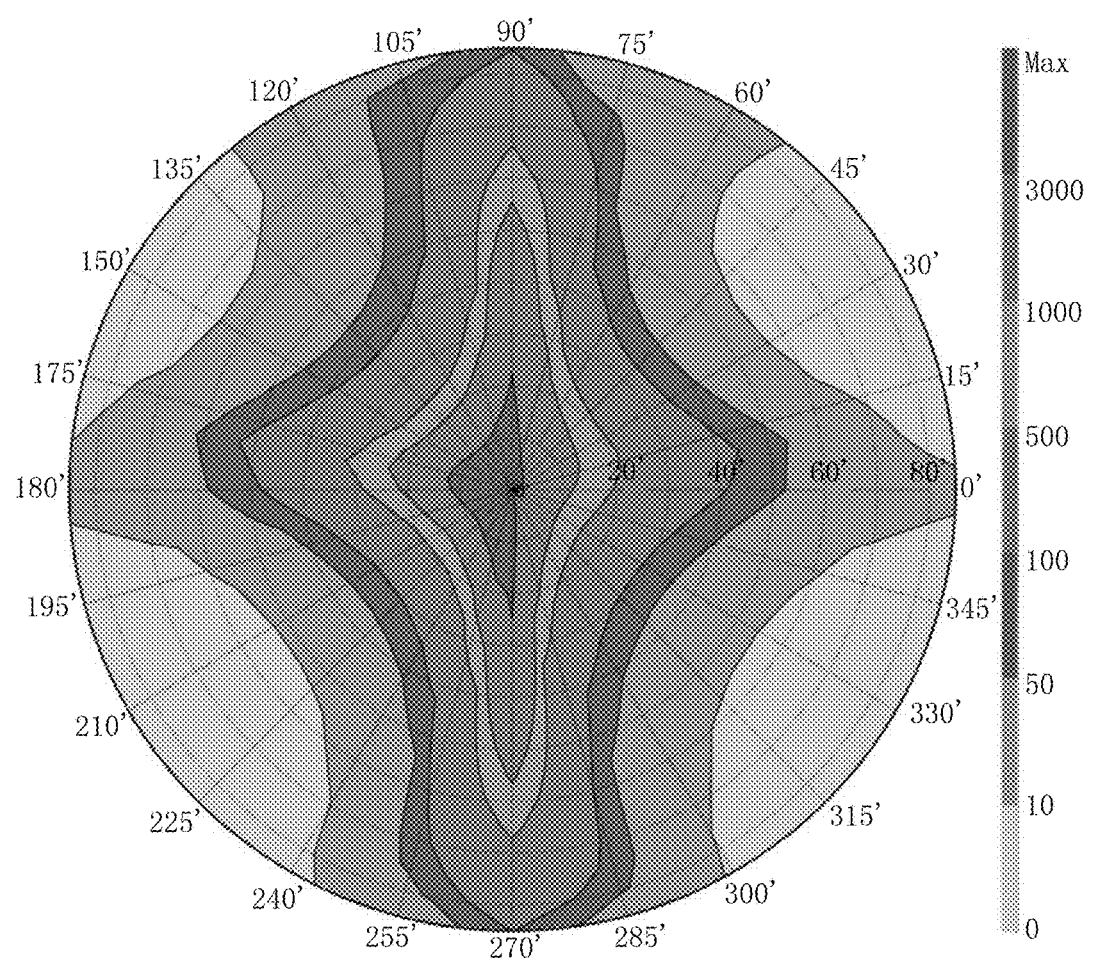
Figure 6C:
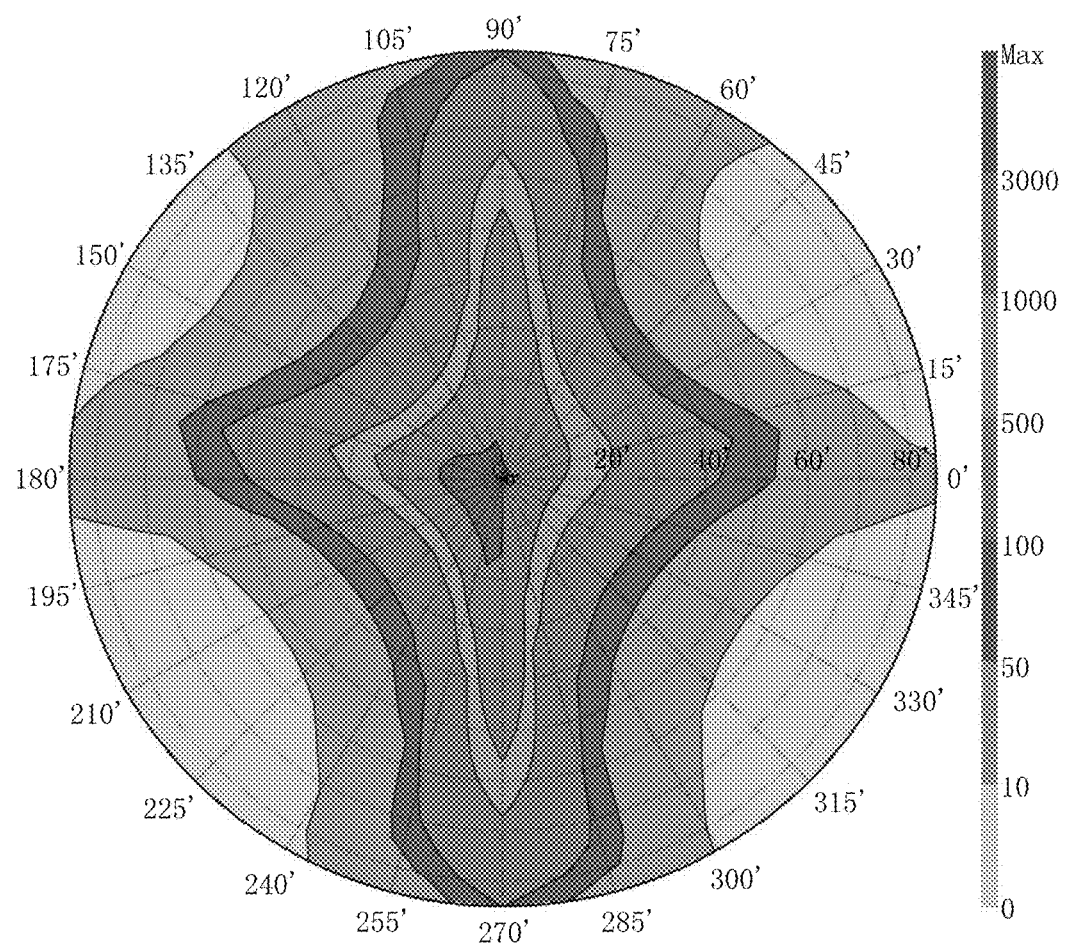
Figure 6D:
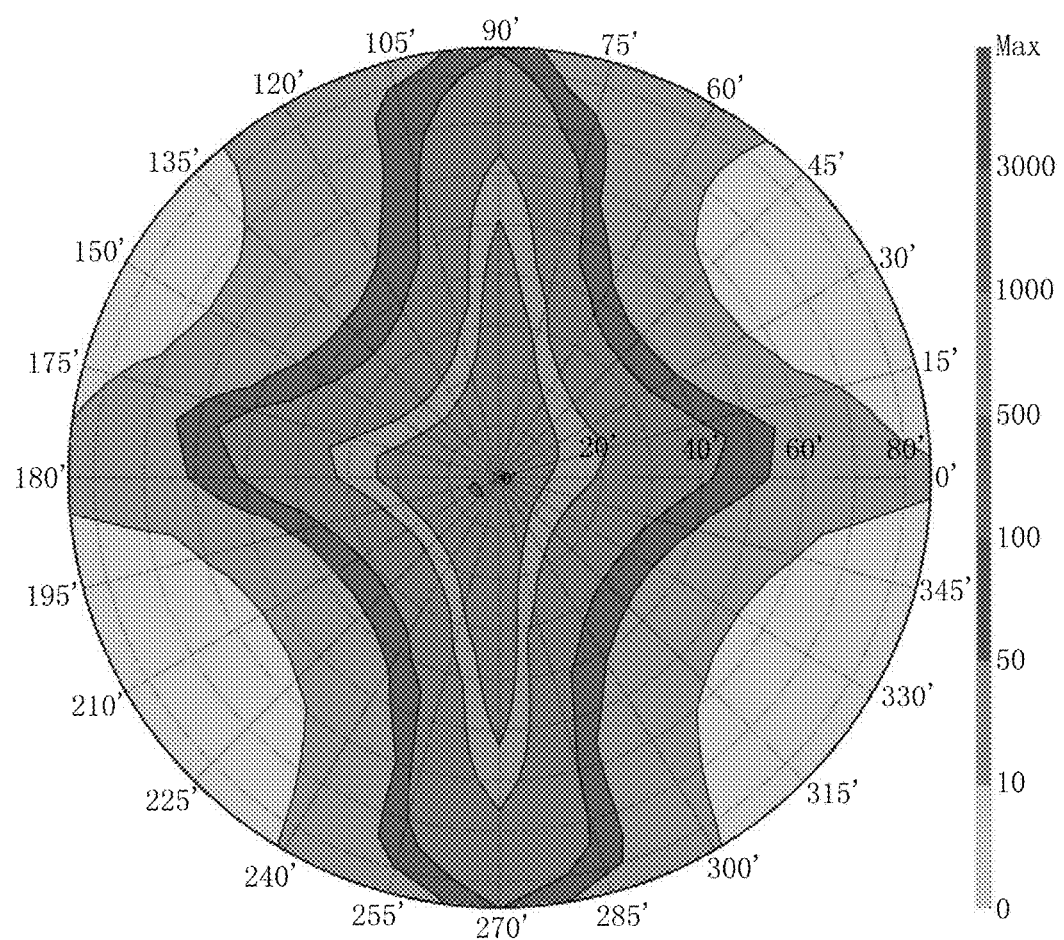
Figure 6E:
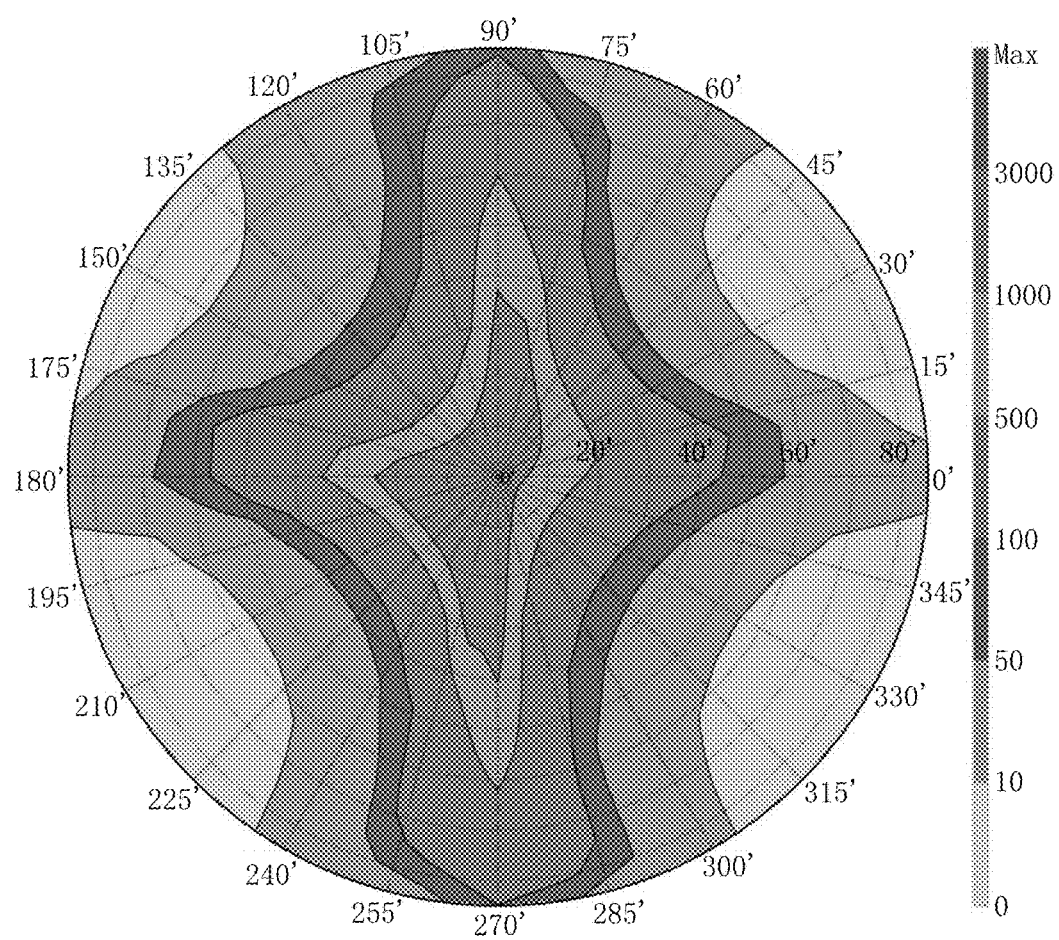

FIGS. 6a-6e show various viewing angle simulation results of the LCD 1 when a bias voltage of 8V is applied to the first electrode 104. Among them, FIG. 6a shows the viewing angle simulation result when the pretilt angle θ is at 30°; FIG. 6b shows the viewing angle simulation result when the pretilt angle θ is at 40°; FIG. 6c shows the viewing angle simulation result when the pretilt angle θ is at 50°; FIG. 6d shows the viewing angle simulation result when the pretilt angle θ is at 60°; and FIG. 6e shows the viewing angle simulation result when the pretilt angle θ is at 70°. As can be seen from FIGS. 6a to 6e, with the increase of the pretilt angle θ, the contrast of the LCD 1 decreases, and the LCD 1 always has a viewing angle of about 85 degrees in the vertical direction and the horizontal direction. For example, when the pretilt angle θ is at 30°, the LCD 1 has a contrast of 3941.9 and has an effective viewing angle of about 85 degrees in the vertical direction and the horizontal direction, as shown in FIG. 6a; when the pretilt angle θ is at 40°, the LCD 1 has a contrast of 3338.55 and has an effective viewing angle of about 85 degrees in the vertical direction and the horizontal direction, as shown in FIG. 6b; when the pretilt angle θ is at 50°, the LCD 1 has a contrast of 3019.74 and has an effective viewing angle of about 85 degrees in the vertical direction and the horizontal direction, as shown in FIG. 6c; when the pretilt angle θ is at 60°, the LCD 1 has a contrast of 2220.06 and has an effective viewing angle of about 85 degrees in the vertical direction and the horizontal direction, as shown in FIG. 6d; and when the pretilt angle θ is at 70°, the LCD 1 has a contrast of 1343.9 and has an effective viewing angle of about 85 degrees in the vertical direction and the horizontal direction, as shown in FIG. 6e. From FIGS. 6a to 6e, it can be seen that the LCD 1 can achieve a wide viewing angle and meets the display requirement when a relatively large bias voltage is applied to the first electrode 104.

Figure 7A:
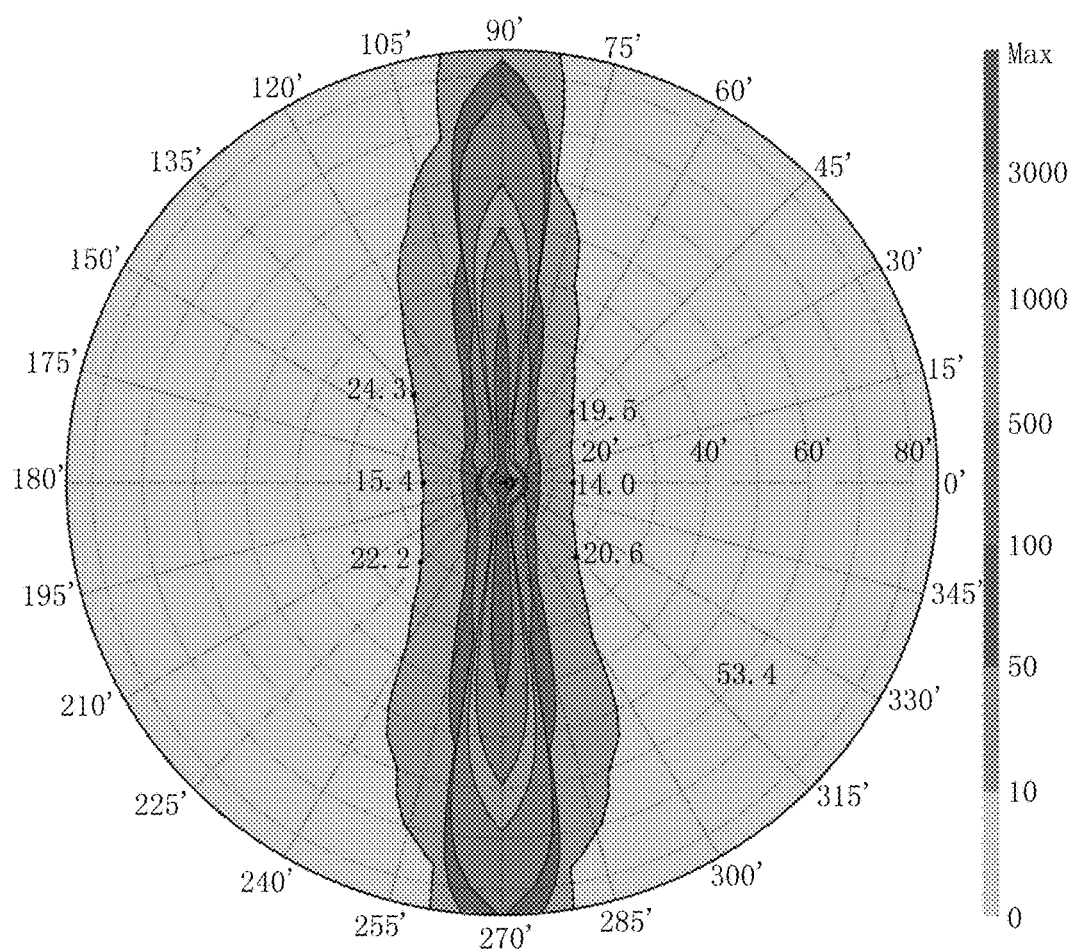
FIGS. 7a-7e show various viewing angle simulation results of the LCD of FIG. 1 when different bias voltages are applied to the first electrode.
Figure 7B:
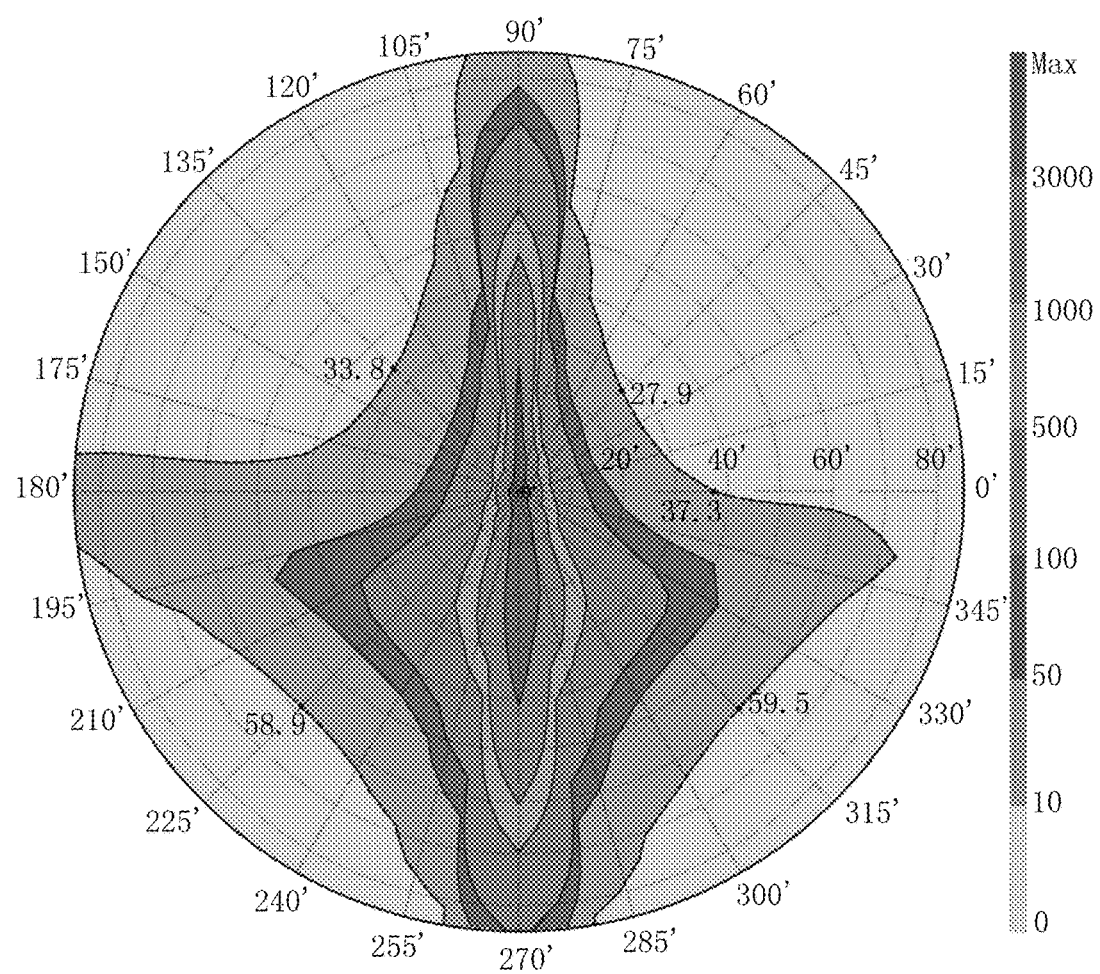
Figure 7C:
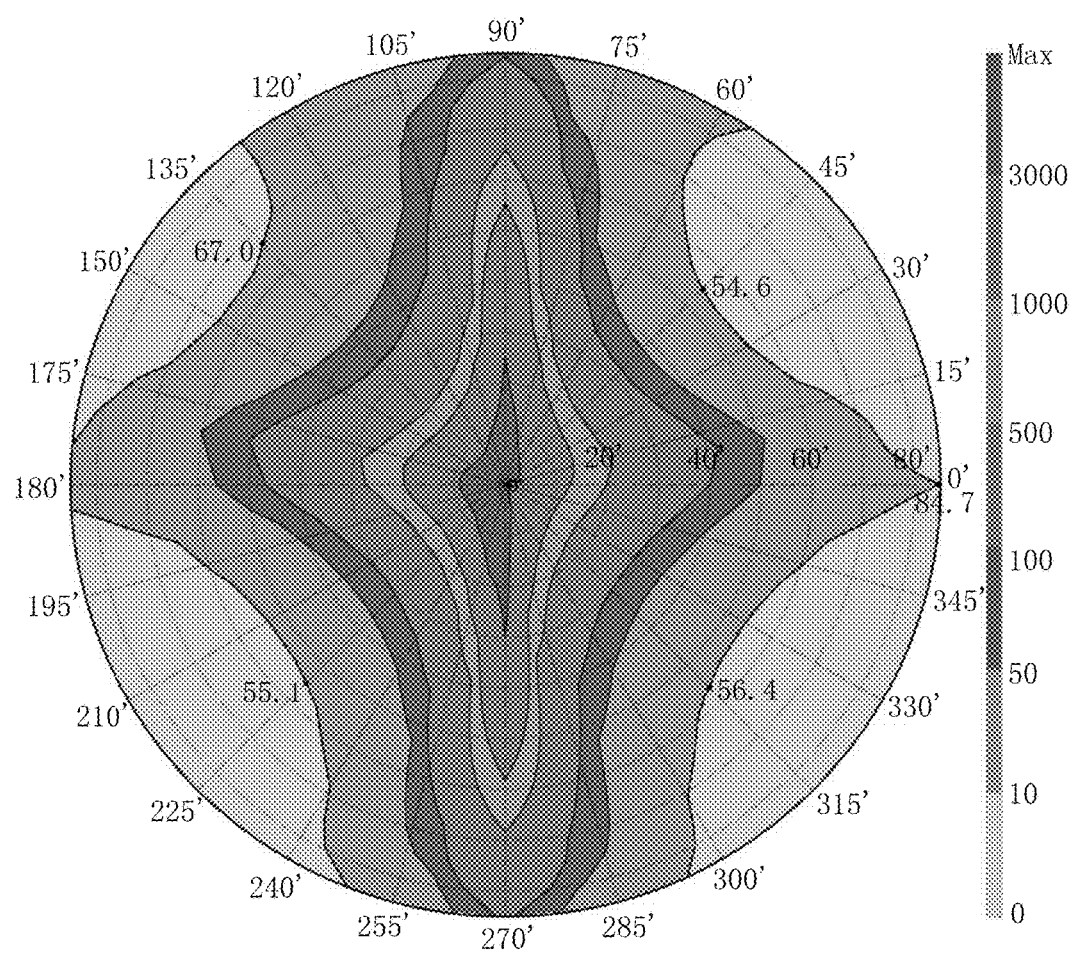
Figure 7D:
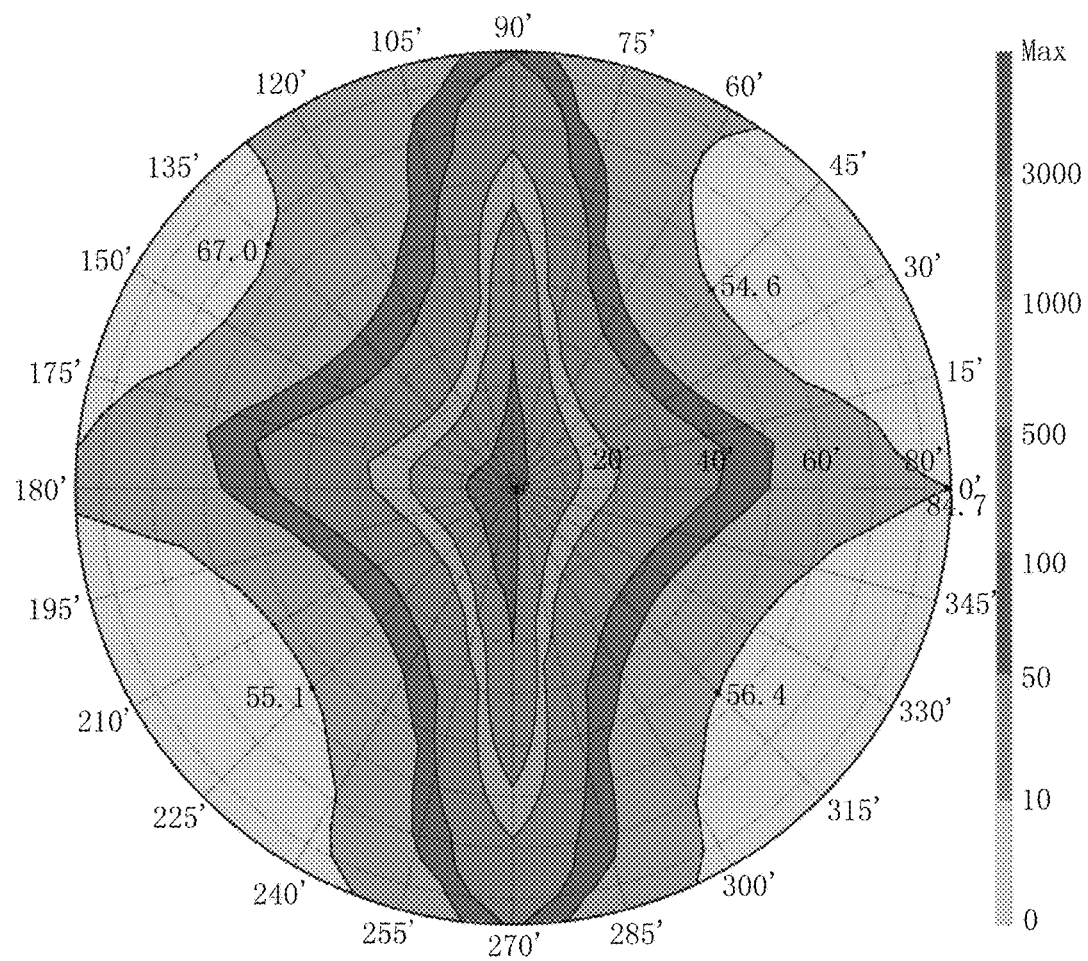
Figure 7E:
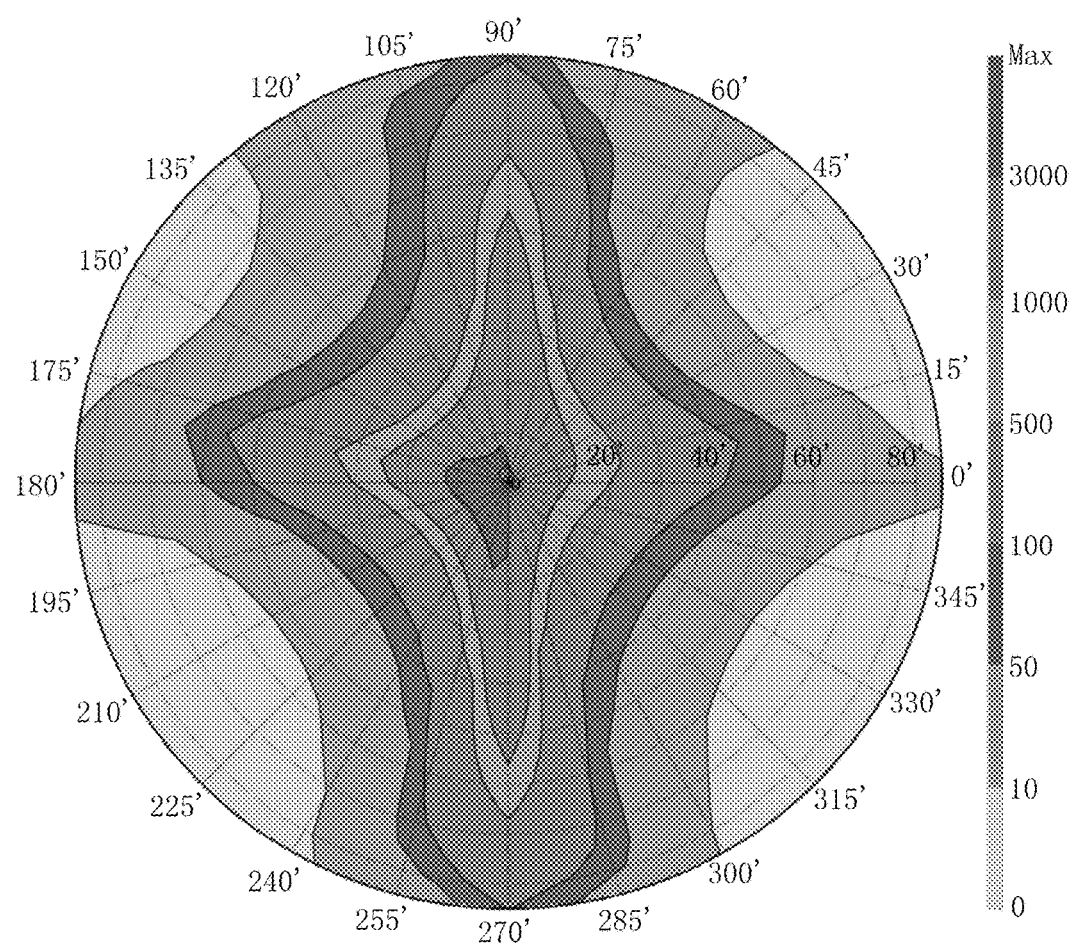

FIGS. 7a-7e show various viewing angle simulation results of the LCD 1 when different bias voltages are applied to the first electrode 104. In FIGS. 7a-7e, it is assumed that the pretilt angle θ is at 50°. When the first electrode 104 is provided with different bias voltages, the effective viewing angles of the LCD 1 as viewed from the horizontal direction are different. For example, when no bias voltage is applied to the first electrode 104, the LCD 1 has a contrast of 5870.64 and has an effective viewing angle from about −15 degrees to about 14 degrees in the horizontal direction, as shown in FIG. 7a; when a bias voltage of 2V is applied to the first electrode 104, the LCD 1 has a contrast of 4420.78 and has an effective viewing angle from about −85 degrees to about 37 degrees in the horizontal direction, as shown in FIG. 7b; when a bias voltage of 4V is applied to the first electrode 104, the LCD 1 has a contrast of 4215.81 and has an effective viewing angle from about −85 degrees to about 78 degrees in the horizontal direction, as shown in FIG. 7c; when a bias voltage of 6V is applied to the first electrode 104, the LCD 1 has a contrast of 3472.83 and has an effective viewing angle from about −85 degrees to about 85 degrees in the horizontal direction, as shown in FIG. 7d; and when a bias voltage of 8V is applied to the first electrode 104, the LCD 1 has a contrast of 3019.74 and has an effective viewing angle from about −85 degrees to about 85 degrees in the horizontal direction, as shown in FIG. 7e.

Therefore, from FIGS. 7a to 7e, it can be seen that, when the bias voltage applied to the first electrode 104 increases, the LCD 1 can switch from a narrow viewing angle to a wide viewing angle. In addition, when no bias voltage is applied to the first electrode 104, the light leakage phenomenon will become more serious, and a narrow viewing angle in the range from about −15 degrees to about 14 degrees can be effectively achieved in the horizontal direction. When the first electrode 104 is applied with a bias voltage of 4V, the LCD 1 will have an effective viewing angle of about −85 degrees to about 78 degrees in the horizontal direction. When the first electrode 104 is applied with a bias voltage of 6V or greater than 6V, the LCD 1 will have an effective viewing angle of about −85 degrees to about 85 degrees in the horizontal direction. However, the contrast of the LCD 1 has little change when the bias voltage is greater than 6V. Therefore, when the first electrode 104 is applied with a relatively large bias voltage (e.g., 4V~8V), the LCD 1 can achieve a wide viewing angle and has a display effect comparable with conventional FFS type LCDs. Thus, when the LCD is displayed with a wide viewing angle, the bias voltage applied to the first electrode is preferably in the range of 4V to 8V.

Figure 8A:
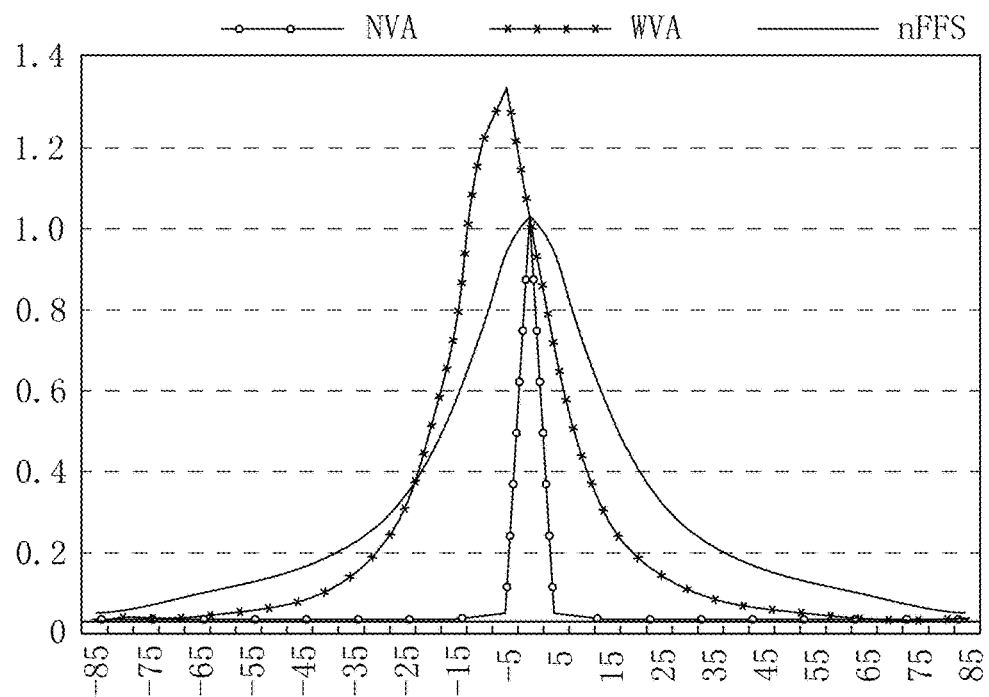
FIG. 8a is a graph showing the contrast (CR) of the LCD of FIG. 1 and a conventional FFS type LCD in a horizontal direction.

FIG. 8a is a graph showing the contrast (CR) of the present LCD 1 and a conventional FFS type LCD in the horizontal direction. In FIG. 8a, it is assumed that all of the liquid crystal molecules 301 in the liquid crystal layer 30 have an initial pretilt angle θ of 50°. The curve NVA denotes the contrast of the present LCD 1 with a narrow viewing angle, the curve WVA denotes the contrast of the present LCD 1 with a wide viewing angle, and the curve nFFS denotes the contrast of a conventional FFS type LCD with negative liquid crystal molecules. As shown in FIG. 8a, in the left side of the horizontal direction, the contrast of the present LCD 1 and the contrast of the conventional FFS type LCD are both decreased as the viewing angle increases, the contrast of the present LCD 1 with a narrow viewing angle drops more rapidly compared with the contrast of the conventional FFS type LCD, and the contrast of the present LCD 1 with a wide viewing angle drops more rapidly compared with the contrast of the conventional FFS type LCD when the viewing angle is greater than 25 degrees. In the right side of the horizontal direction, the contrast of the present LCD 1 and the contrast of the conventional FFS type LCD are also both decreased as the viewing angle increases, and the contrast of the present LCD 1 with a narrow viewing angle or with a wide viewing angle drops more rapidly as compared with the contrast of the conventional FFS type LCD. In addition, it can be seen from FIG. 8a that the contrast of the present LCD 1 and the contrast of the conventional FFS type LCD are in a comparable level.

Figure 8B:
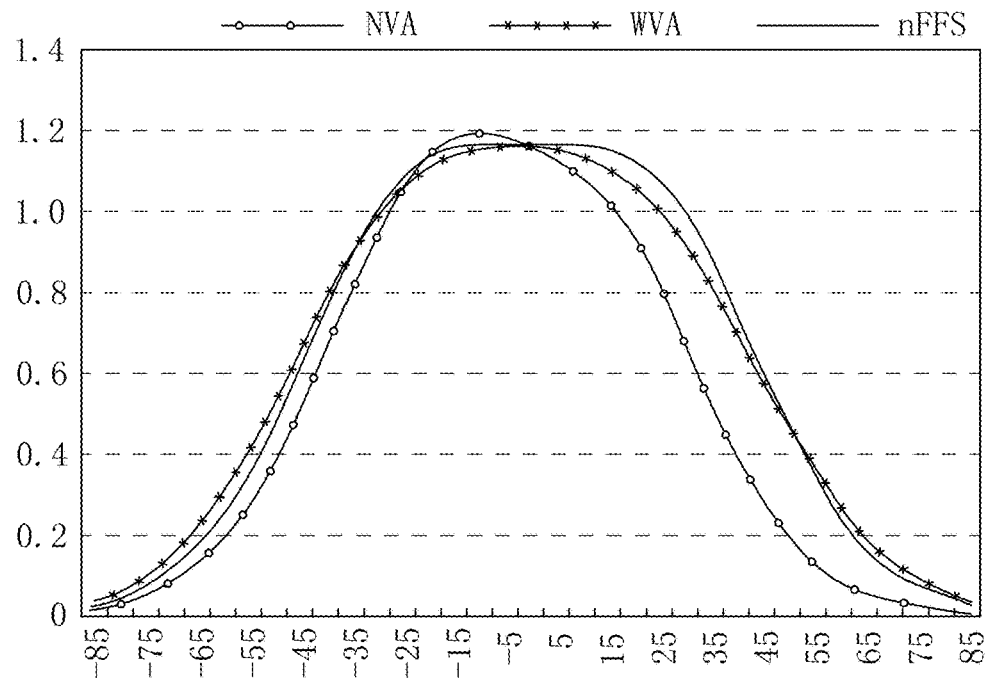
FIG. 8b is a graph showing the contrast (CR) of the LCD of FIG. 1 and a conventional FFS type LCD in a vertical direction.

FIG. 8b is a graph showing the contrast (CR) of the present LCD 1 and a conventional FFS type LCD in the vertical direction. In FIG. 8b, it is assumed that all of the liquid crystal molecules 301 in the liquid crystal layer 30 have an initial pretilt angle θ of 50°. The curve NVA denotes the contrast of the present LCD 1 with a narrow viewing angle, the curve WVA denotes the contrast of the present LCD 1 with a wide viewing angle, and the curve nFFS denotes the contrast of a conventional FFS type LCD with negative liquid crystal molecules. As shown in FIG. 8b, in the lower side of the vertical direction, the contrast of the present LCD 1 and the contrast of the conventional FFS type LCD are both decreased as the viewing angle increases, and the contrast of the present LCD 1 drops at almost the same speed as compared with the contrast of the conventional FFS type LCD. In the upper side of the vertical direction, the contrast of the present LCD 1 and the contrast of the conventional FFS type LCD are also both decreased as the viewing angle increases, the contrast of the present LCD 1 with a wide viewing angle drops at almost the same speed as compared with the contrast of the conventional FFS type LCD, and the contrast of the present LCD 1 with a narrow viewing angle drops a little more rapidly as compared with the contrast of the conventional FFS type LCD. In addition, it can be seen from FIG. 8b that the contrast of the present LCD 1 and the contrast of the conventional FFS type LCD are in a comparable level.

In the following table, it is assumed that the liquid crystal molecules 301 in the liquid crystal layer 30 have an initial pretilt angle θ of 50°, NVA denotes the present LCD 1 in the narrow viewing angle display mode, WVA denotes the present LCD 1 in the wide viewing angle display mode (a bias voltage of 6V or 8V is applied to the first electrode 104), and nFFS denotes a conventional FFS type LCD with negative liquid crystal molecules. As can be seen from the table, the transmittance (TR) and the response time (RT) of the present LCD 1 with a narrow viewing angle or with a wide viewing angle are comparable with the transmittance (TR) and the response time (RT) of the conventional FFS type LCD.

| category | nFFS | NVA | WVA (bias voltage of 6 V) | WVA (bias voltage of 8 V) |
|---|---|---|---|---|
| voltage | 4.2 | 6 | 6 | 7.6 |
| transmittance | 3.48% | 2.94% | 3.14% | 3.15% |
| response time | 31.4 | 21.38 | 33.58 | 40.63 |
|  | 16.58 | 15.41 | 28.21 | 28.36 |

Figure 9:
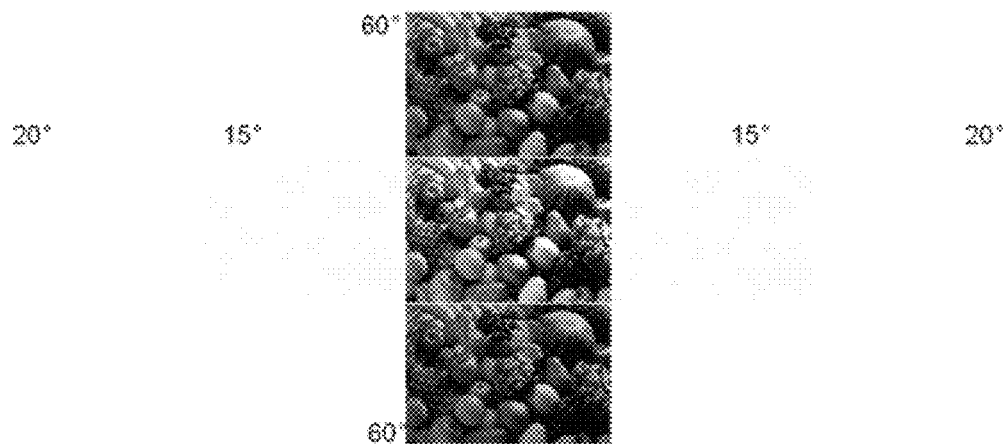
FIG. 9 shows the display effect of the LCD of FIG. 1 in the narrow viewing angle display mode.

FIG. 9 shows the display effect of the present LCD 1 in the narrow viewing angle display mode. In FIG. 9, the pretilt angle θ of the liquid crystal molecules 301 is at 50°, and no bias voltage is applied to the first electrode 104. It can be seen from FIG. 9, at least in the horizontal direction, the display effect when viewed from a viewing angle of greater than 15 degrees is poor compared with the display effect when viewed from the front of the screen. Thus, the present LCD 1 can satisfy the demand of protecting privacy in public places when the present LCD 1 is displayed in the narrow viewing angle display mode.

Figure 10:
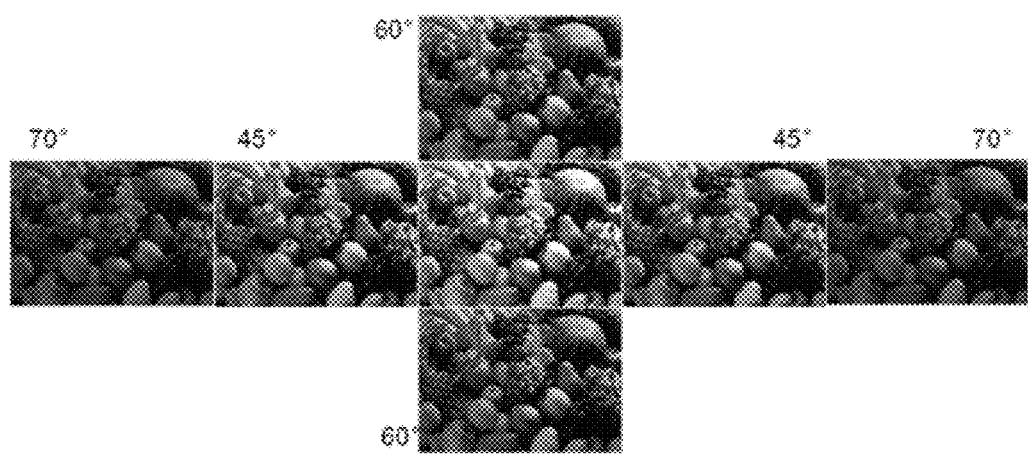
FIG. 10 shows the display effect of the LCD of FIG. 1 in the wide viewing angle display mode.

FIG. 10 shows the display effect of the present LCD 1 in the wide viewing angle display mode. In FIG. 10, the pretilt angle θ of the liquid crystal molecules 301 is at 50°, and a bias voltage of 4V is applied to the first electrode 104. It can be seen from FIG. 10, in the vertical direction, the display effect when viewed from a viewing angle of 60 degrees is comparable with the display effect when viewed from the front of the screen; in the horizontal direction, the display effect when viewed from a viewing angle of 70 degrees is comparable with the display effect when viewed from the front of the screen. Thus, the present LCD 1 can achieve a relatively large viewing angle when the present LCD 1 is displayed in the wide viewing angle display mode. The present LCD 1 can switch from the narrow viewing angle display mode to the wide viewing angle display mode by applying a bias voltage to the first electrode 104 of the first substrate 10.

From the above, in the present LCD 1, all of the liquid crystal molecules 301 in the liquid crystal layer 30 are tilted at the same pretilt angle θ relative to the alignment films 106, 210. By applying a bias voltage to the first electrode 104 or not, the rotation of the liquid crystal molecules 301 of the liquid crystal layer 30 can be controlled, and accordingly the present LCD 1 can switch between a narrow viewing angle and a wide viewing angle.

When no bias voltage is applied to the first electrode 104, lights passing the liquid crystal molecules 301 with the pretilt angle θ are not matched with the light transmission axis X1, X2 of the first polarizer 102 and the second polarizer 202, a light leakage phenomenon in the dark state is resulted and the contrast between the bright state and the dark state of the present LCD 1 is thereby decreased to achieve a narrow viewing angle display mode.

When a bias voltage is applied to the first electrode 104, a vertical electric field is generated between the first substrate 10 and the second substrate 20 to cause the liquid crystal molecules 301 of the liquid crystal layer 30 to rotate. As the liquid crystal molecules 301 rotate, the tilt angle of the liquid crystal molecules 301 is gradually reduced from the pretilt angle θ. Particularly, when a relatively large bias voltage is applied to the first electrode 104, the tilt angle of all the liquid crystal molecules 301 may reduce from the pretilt angle θ to nearly zero degree in which the liquid crystal molecules 301 are substantially parallel to the substrates 10, 20, the light leakage phenomenon in the dark state will not occur, the contrast between the bright state and the dark state of the present LCD 1 is thereby increased to achieve a wide viewing angle display mode.

Accordingly, in another aspect, a method of controlling a viewing angle of the LCD 1 is provided. The method includes the steps: when the LCD 1 is required to display with a narrow viewing angle, applying no bias voltage to the first electrode 104; and when the LCD 1 is required to display with a wide viewing angle, applying a bias voltage to the first electrode 104. Preferably, all of the liquid crystal molecules 301 in the liquid crystal layer 30 have the same pretilt angle θ which is in the range of 30° to 70°, and the bias voltage applied to the first electrode 104 is in the range of 4V to 8V.

Therefore, the present LCD 1 can easily achieve a narrow viewing angle and a wide viewing angle by controlling the bias voltage applied to the first electrode 104 of the first substrate 10. It is not required to use a louver shielding film or to provide a dual light source backlight system in the present LCD 1, the present LCD 1 can be switched between a narrow viewing angle and a wide viewing angle according to requirements, without increasing the thickness and the cost of the LCD and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) with a switchable viewing angle, comprising:
   a first substrate being provided with a first electrode and a first alignment film thereon;
   a second substrate being provided with a second electrode, a third electrode and a second alignment film thereon, wherein one of the second electrode and the third electrode is a common electrode, and the other one of the second electrode and the third electrode is a pixel electrode; and
   a liquid crystal layer being disposed between the first alignment film and the second alignment film, the liquid crystal layer comprising a plurality of liquid crystal molecules, wherein the liquid crystal molecules are negative liquid crystal molecules, all of the liquid crystal molecules in the liquid crystal layer are tilted at the same pretilt angle relative to the alignment films, the pretilt angle is in the range of 30°~70°; and a printed circuit board for providing a bias voltage to the first electrode;

wherein when no bias voltage is applied to the first electrode, the LCD is displayed with a narrow viewing angle; and when a bias voltage is applied to the first electrode to generate a vertical electric field between the first substrate and the second substrate, the LCD is displayed with a wide viewing angle;

wherein when the LCD is displayed with a wide viewing angle, the bias voltage applied to the first electrode is in the range of 4V to 8V.

2. The LCD according to claim 1, wherein all of the liquid crystal molecules in the liquid crystal layer are tilted in a counter-clockwise direction to form the pretilt angle.

3. The LCD according to claim 1, wherein the first alignment film is rubbed to have a first rubbing direction, the second alignment film is rubbed to have a second rubbing direction, the liquid crystal molecules are arranged and oriented along the first rubbing direction of the first alignment film and along the second rubbing direction of the second alignment film at a tilted state with the same pretilt angle.

4. The LCD according to claim 3, wherein the first rubbing direction and the second rubbing direction are extended in the same direction.

5. The LCD according to claim 1, wherein the polarity of the bias voltage applied to the first electrode is contrary to the polarity of the common voltage provided to the common electrode.

6. The LCD according to claim 1, wherein the second electrode is a pixel electrode, and the third electrode is a common electrode.

7. The LCD according to claim 1, wherein the third electrode is a pixel electrode, and the second electrode is a common electrode.

8. The LCD according to claim 1, wherein the first electrode is a surface electrode without being patterned.

9. The LCD according to claim 1, wherein at least one of the second electrode and the third electrode is patterned to form a plurality of electrode stripes which are arranged in parallel to each other.

10. The LCD according to claim 1, wherein the first substrate further comprises a first transparent base, the first electrode is arranged on a surface of the first transparent base facing the liquid crystal layer, the first alignment film is arranged on a surface of the first electrode facing the liquid crystal layer.

11. The LCD according to claim 1, wherein the second substrate further comprises a second transparent base and an insulating layer, the second electrode is arranged on a surface of the second transparent base facing the liquid crystal layer, the insulating layer is arranged on a surface of the second electrode facing the liquid crystal layer, the third electrode is arranged on a surface of the insulating layer facing the liquid crystal layer, the second alignment film is arranged on a surface of the third electrode facing the liquid crystal layer.

12. A method of controlling the viewing angle of the LCD of claim 1, comprising the steps:
when the LCD is required to display with a narrow viewing angle, applying no bias voltage to the first electrode; and
when the LCD is required to display with a wide viewing angle, applying a bias voltage to the first electrode, wherein the bias voltage applied to the first electrode is in the range of 4V to 8V.

* * * * *